Dec. 24, 1968  G. E. GROSHEIM  3,418,189
PROCESS FOR MAKING DECORATIVE LAMINATES
Filed June 2, 1964

INVENTOR.
GENE EDWARD GROSHEIM
BY James T. Dunn
ATTORNEY

United States Patent Office 3,418,189
Patented Dec. 24, 1968

3,418,189
PROCESS FOR MAKING DECORATIVE LAMINATES
Gene Edward Grosheim, Cincinnati, Ohio, assignor to Formica Corporation, Cincinnati, Ohio, a corporation of Delaware
Filed June 2, 1964, Ser. No. 372,026
6 Claims. (Cl. 156—277)

ABSTRACT OF THE DISCLOSURE

A decorative laminate comprising an assembly of a plurality of thermosetting phenolic resin impregnated core sheets onto which is superimposed a noble thermosetting resin impregnated decorative sheet, said decorative sheet having on its decorative surface a plurality of discrete protuberant areas of a different color and a different optical reflectivity than the areas of the decorative surface that are not in relief, said assembly having been heat and pressure consolidated to a unitary structure, during which heat and pressure consolidation step said thermosetting resins are converted to the thermoset state and to the process for preparing the same.

---

Figure 1:
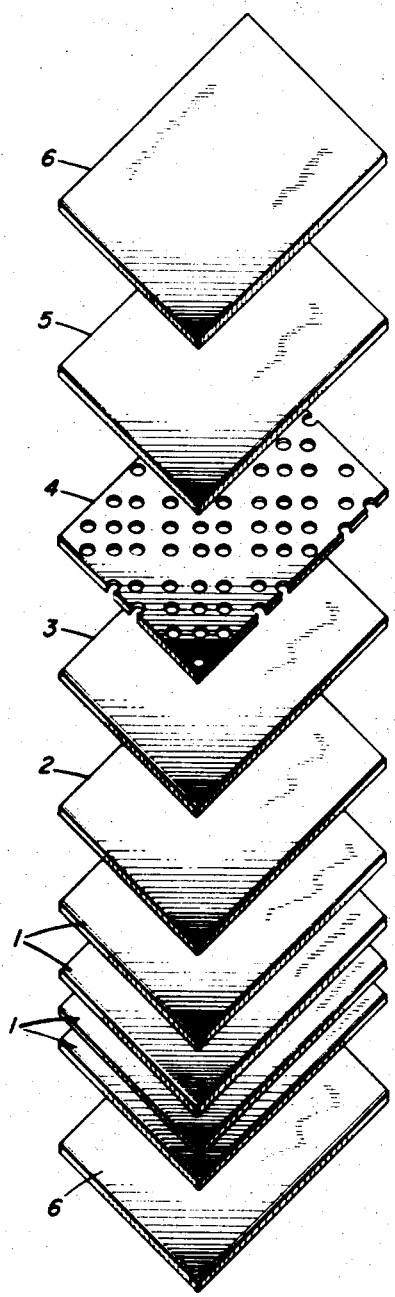

This invention relates to a multicolored and variable gloss laminate in relief and to the process of preparing the same. More particularly, this invention relates to a decorative laminate having protrusions extending outwardly from the decorative surface, which protrusions are of a different degree of gloss than the background surface of the decorative laminate wherein the protrusions are of a different color from the background of the laminate.

One of the objects of the present invention is to produce a decorative laminate having on its decorative surface, protrusions of any selected design which protrusions are of a different degree of gloss and a different color from the background surface of the laminate. A further object of the present invention is to produce a decorative laminate in multicolor and variable gloss having protrusions which extend outwardly from the decorative surface of the laminate which protrusions have on their surfaces a different degree of gloss and a different color than that of the background material in relief. These and other objects of the present invention will be discussed in greater detail hereinbelow.

Laminated articles and, more particularly, decorative laminated articles have been produced commercially for a number of years. In the production of these prior art laminates, it has been conventional to arrange a series of core sheets which have been impregnated with a thermosetting resin and, more particularly, generally a phenolic resin, in a stacked relationship onto which is superimposed a decorative sheet impregnated with a nobler thermosetting resin having good color and good color retention properties, which decorative sheet is generally covered with a protective overlay sheet which is again a fibrous sheet impregnated with a noble resin so as to impart almost a complete measure of transparency to the overlay sheet while retaining its protective qualities in the ultimate assembly. When these various resin impregnated sheets had been arranged in this manner in the prior art, the assembly would be placed into a laminating press having a polished stainless steel press plate in contact with the overlay sheet, and the requisite measure of heat and pressure applied until the thermosetting resins in the various lamina are converted to a thermoset state and the entire structure converted to a unitary assembly. On removal from the laminating press, the decorative surface has a comparatively uniform glossy surface imparted thereto by virtue of the polished characteristic of the press plate. Notwithstanding, the aesthetically attractive appearance of such a decorative laminate, I have found that I can enhance even further the aesthetic appeal of these laminates by the utilization of a configurative, decorative stencil of a non-adherable material which is superimposed upon the decorative sheet, which normally provides the outer decorative surface of a decorative laminate and onto which non-adherable material, I superimpose a noble, thermosetting resin impregnated sheet or foil of a color different from the decorative sheet and upon consolidation of the total structure to a unitary assembly, the non-adherable material is separated from the laminated structure along with that part of the resin impregnated foil which partially bonds to the non-adherable material while leaving that part of the resin impregnated foil which has become bonded to the overlay sheet or to the decorative sheet intact as a part of the decorative laminate. The layer above the stencil may also be a resinous, pigmented film cast onto a sheet of cellophane, Mylar or the like, or cast onto the press plate and allowed to bond through the openings in the stencil.

The configurative, decorative stencil may be a non-adherable paper or a non-adherable aluminum foil or a thin laminate composed of a layer of paper bonded to a non-adherable aluminum foil. The non-adherable paper may be a parchment type of paper, of which a plurality are available commercially. The non-adherable metal foils as well as the laminate of the paper and the non-adherable metal foils are also commercially available. Also suitable for this purpose are papers coated, treated or impregnated with polyethylene, polypropylene or the polyfluoro carbons and the like. Films of polyethylene, polypropylene may also be used. Silicone oil treated papers may also be used and are available commercially. Papers coated with sodium alginate and other salts of alginic acid are suitable for this purpose and are also available commercially. Papers treated with thermoset resins, such as the aminoplast resins, including the urea resins and triazine resins, which are substantially fully cured, are also satisfactory for this purpose and are available commercially. Still further, papers treated with fully cured thermoset silicone resins are also suitable. Additionally, one may use metal foils such as the aluminum foils from which cut-outs can be taken to provide a stencil. To prevent the possible wrinkling of the aluminum foil, it may be mounted by gluing to kraft paper and then cut to the desired stencil. In using such a foil mounted stencil, the metallic layer would be in contact with the upper surface of the laminate, whereas the mounting support layer would be in contact with the noble thermosetting resin impregnated foil, which resin impregnated foil is in contact with the polished press plate during the laminating operation. The stencil is cut so as to provide decorative configurations such as, stars, leaves, flowers or any one or more of the almost limitless geometrical designs. Message bearing stencils may be cut and utilized in this connection. Obviously, these stencils may be used in multiples and in assortments for instance, in side by side relationship.

When the stencils, cut to the choice desired, are superimposed on the overlay sheet, they provide a barrier between said overlay sheet and the polished steel press plate, except in those areas where the cut-outs occur. When the noble thermosetting resin impregnated foil is superimposed over the stencil, these cut-outs in the stencil are then covered so that the overlay sheet is prevented from coming in contact with the polished steel press plate and, as a consequence, the entire body of the overlay sheet is precluded from accepting any polishing effect directly from the polished steel press plate. However, during the laminating operation, the resin impregnated foil superimposed above the stencil is bonded to the overlay sheet and, as a consequence, when the stencil barrier material is removed, all of the noble resin impregnated foil is removed with the stencil, except those parts of said foil which were immediately superimposed above the cut-outs in the stencil. This gives a raised effect to those areas on the ultimate laminate which is significantly above the level of the base of the decorative laminate and gives a clear, three-dimensional structure on the surface in relief. Since the resin impregnated foil which is superimposed on the stencil will ordinarily and preferably come in contact with the polished steel plates, those protuberants developed in the laminating operation will have on their flat outer surfaces, a glossier finish imparted by the polished steel press plate than will those areas of the laminate which are protected from contact with the polished steel press plate by the presence of the stencil. The stencil may cover all or part of the surface of the laminate. For instance, on a laminate of 10 ft. length and 4 ft. width, a continuing, repeating, extensive pattern can be cut into the stencil that will cover every part of the laminate with the two-textured design in relief. In other cases, the textured pattern may be confined to certain areas of the sheet for instance, near its edges to form a border, or near its center to create an attractive central appearance or to display suitable lettering in the form of a message. Since the stencil is a non-adherable paper, it can be removed from the consolidated assembly upon removal from the laminating press together with the remnants of the impregnated foil thus leaving an aesthetically attractive appearance to the ultimate laminate. In certain decorative laminate structures, the press plate is not highly polished but instead is designed to impart a satiny appearance to the laminate. When such a press plate is used in the process of the present invention, there still will be a marked contrast between those discrete areas of the surface which were under the stencil and those areas having the satiny appearance which were not protected by the stencil but which now provide the protuberants on the surface of the laminate. In either event, a distinct contrast will exist between the two separate classes of areas. The thickness of the stencil whether paper or metal foil or comparable non-adherable materials, may be as desired such as from about 0.00005" up to about 0.030". The preferred thickness is from about 0.002" up to about 0.010". Commercially available aluminum foils are generally about 0.0005" thick and may be used directly or mounted on 40 lb. kraft paper to prevent wrinkling or tearing.

The noble thermosetting resin impregnated overlay sheet which in the assembly is immediately below the stencil, may be a solid color or may have imprinted thereon, a configurative or decorative design. The range of different colors and designs in this overlay sheet is virtually without limit. The noble thermosetting resin impregnated foil that is superimposed above the stencil in the assembly, may also be varied widely and practically without limit in solid colors or in a colored printed decorative design, which colors are different from the colors to be found in the decorative or print sheet.

Reference is made to the U.S. Patent No. 3,050,434 which describes in sufficient detail the prior art processes for the general preparation of the laminates to which the instant invention is directed. It can be seen that the total number of core sheets can be varied depending on ultimate thickness of the laminate desired, and that one could use the process outlined in said patent with the stencils being used in keeping with the present invention as the bottommost layers and the topmost layers of the total assembly between the polished steel plates and the overlay sheets in each instance, thereby producing a back to back but separable pair of laminates. The aforementioned patent is incorporated herein by reference in order to avoid unnecessary redundancies of procedural techniques that are well-known in the art.

The products produced according to the process of the present invention will find their primary end use as laminates for wall coverings where the surfaces are not subjected to any significant wear due to attrition. However, these laminates may also be used for horizontal applications such as table tops, counters, vanitories, and the like. Through the proper selection of available resins for the overlay sheet and the overlay foil, these laminates may be adapted for either indoor or outdoor use. There are presently available, suitable resins that provide weather resistant surfaces when used in decorative laminates purposely designed for outdoor use. Some of these resins are, in certain instances, available commercially while others are still under long range experimental tests and may be selected according to the particular end use contemplated for these laminates.

Figure 2:
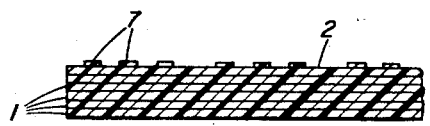
Figure 3:
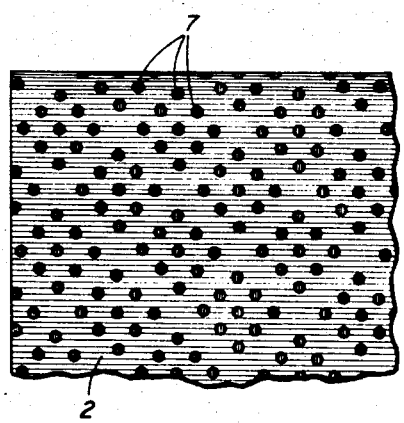

Reference is made to the accompanying drawing in which FIG. 1 shows an assembly of the various plies used in the present invention between the press plates before consolidation. FIG. 2 shows a side elevational view of the finished laminate while FIG. 3 shows a top view of the finished laminate. In FIG. 1, the sheets 1 are phenolic resin impregnated kraft paper that provide the core material. A thermosetting resin impregnated barrier sheet (not shown) is optional and may be superimposed above the core sheets 1. Positioned immediately above the barrier sheet or the core sheets is the decorative print sheet 2 onto which is placed a protective overlay sheet 3 which is optional for solid colors but necessary for use with printed decorative sheets. Next comes the perforated stencil 4 onto which is placed the noble thermosetting resin impregnated overlay sheet 5. When the total laminate assembly has been arranged in superimposed relationship, it is placed between the plates 6 and the entire assembly is heat and pressure consolidated to a unitary structure. Upon removal from the laminating machine and cooled, the perforated stencil 4 is removed along with those portions of the colored overlay sheet 5 which are in direct contact with the stencil 4 and which have not become bonded to the base overlay sheet 3. In FIG. 2, the sheets 1 are core sheets, 2 is the decorative sheet with or without the overlay sheet and 7 are the protuberant pieces of the sheet 5. In FIG. 3, 2 is the decorative sheet and 7 are the protuberant moieties of 5.

In the laminating art, over a period of years, it has been conventional to utilize a phenolic resin to impregnate the core sheets which are kraft paper and after impregnation and conversion to the thermoset state, impart a significant measure of rigidity to the total laminate structure. The use of the phenolic resin is an economic expedient inasmuch as the core sheets in the laminate will not generally be visible once the laminate is placed in its ultimate position. These phenolic resins are generally referred to as a base or low quality resins, primarily because of the color of the resin in the thermoset state. The color is a very dark brown or black. If desired, a more noble resin could be used in the core sheets if it were economically feasible to do so, and if a lighter color in the core was required for any reason. The noble resins are those which in the converted state, i.e. the thermoset state, are a light color naturally and can be tinted with dyes and pigments in a wide range of colors from white to the pastels and the deeper shades of red, blue, green and the like. These noble resins are available commercially from a substantial plurality of sources and are identified as the urea-formaldehyde resins, the aminotriazine-formaldehyde resins, such as the melamine-formaldehyde resins, the benzoguanamine-formaldehyde resins, the acetoguanamine-formaldehyde resins and the like, the unsaturated polyester resin compositions containing a cross-linking monomer such as styrene and the like, the epoxy resins and the like. In preparing the laminate assembly prior to the pressing operation, it is generally desirable to utilize a barrier sheet between the core sheets and the decorative overlay sheet so as to inhibit the tendencies of the dark phenolic resin and the dark kraft paper to show through the surface of the decorative sheet and thereby imparting a defect to the ultimately produced laminate. This barrier sheet is not imperative but the cost of adding such a sheet is so slight as to be worthwhile protection against rejects. The barrier sheet may or may not be impregnated with a noble thermosetting resin and, in fact, may have no resin content at all, thereby providing a mere paper layer which can absorb resin from the core sheets on one side and the decorative sheet on the other in the pressing operation. It is preferred, however, to use a noble thermosetting resin in the barrier sheet. The overlay sheet is impregnated conventionally with one of the noble thermosetting resins. The overlay sheet which is superimposed above the decorative sheet is impregnated with a clear, i.e., unpigmented, noble thermosetting resin so that on the completion of the pressing operation, the overlay sheet becomes transparent and permits the design on the decorative sheet to be seen therethrough. The overlay sheet functions as a protective layer to diminish any tendency to eradicate the decorative features of the decorative sheet due to attrition. In any given assembly, if a particular noble thermosetting resin is selected for the decorative sheet, ordinarily the same resin will be selected for the impregnation of the barrier sheet, the overlay sheet and the ultimate overlay foil.

The stencils used in the present invention are referred to hereinabove as being a non-adherable material, but it is only necessary to have at least one face of such a stencil that has a non-adherable characteristic. That face of the stencil will be the one that is superimposed upon and in contact with the decorative sheet or the overlay sheet on top of the decorative sheet. When the non-adherable material is a metal foil, both sides will have the non-adherable characteristic. However, when a piece of kraft paper is bonded to the metal foil to provide a stencil, the paper side will be receptive to the upper resin impregnated or coated sheet, and will be removed with the foil at the end of the operation.

It has been mentioned hereinabove that in the place of the thermosetting resin impregnated foil that is superimposed above the stencil, there may be used other resinous or polymeric materials which will be transferred during the heating and pressing operation through the stencil to the face of the decorative side of the laminate. These transfers may be in the nature of a self-supporting film of a thermoplastic polymer or a thermosetting resinous material or it may be a coating of such a polymeric material which is applied to a carrier film such as cellophane, polyethylene, polypropylene and the like, wherein the layer of resinous material coated on such a supporting film is transferred, in part only, to the decorative side of the ultimate laminate through the perforations in the stencil. The remaining part of the resinous material mounted on the carrier film is removed with the removable stencil and with the carrier film after the heating and pressing operation has been completed. A still further aproach and modification of the present invention resides in the coating of the stainless steel polished press plate with a film of a thermoplastic or thermosetting polymer or resinous material, which coated press plate is then superimposed upon the stencil with the resinous material in direct contact with the stencil, whereupon the parts of such resinous material are transferred through the perforations in the stencil to the decorative side of the laminate structure at the end of the heating and pressing operation. In all of these instances, whether it is an impregnated foil, a self-supporting film, a film on a carrier sheet or a film on the press plate, the color of such resinous material must be of a different color or shade of color from the color of the surface sheet of the laminate which is visible immediately below the stencil.

Although the principal objective of the present invention is to utilize only one stencil, it is within the contemplations of the present invention to make use of a plurality of stencils such as 2, 3, 4 or more. When using more than one stencil, the stencil with the largest cut-out areas will be superimposed on the uppermost surface of the decorative laminate whereupon an impregnated sheet or a film as outlined hereinabove, will be superimposed on the large cutout stencil. This will be followed by a further stencil which has cut-outs that will be superimposed over the cut-outs of the first stencil but will be smaller in size. On top of the second cut-out stencil will be placed a foil or film of resinous material of a color different from the color superimposed on the first stencil and either the same as or different from the color of the visible surface of the main body of the laminate. If a third stencil is desired, it may be superimposed above the aforementioned assembly, which third stencil will have perforations which are of smaller dimensions than the perforations of the second stencil and which perforations are superimposed above the perforations of the second stencil. Again, if a third stencil is used, a foil or film of different color should be used above the third stencil and positioned between said third stencil and the press plate.

I claim:

1. A process for producing a laminate having discrete protuberant areas of its surface which possess different colors and different optical reflectivities comprising arranging an assembly in stacked relationship of thermosetting resin impregnated core sheets, a noble thermosetting resin impregnated decorative sheet, superimposing on said assembly in contact with the uppermost sheet, a configurative, decorative, stencil of a non-adherable material, superimposing on said assembly, in contact with said non-adherable material, a layer of a polymeric material of a color different from the color of the resin in the decorative sheet, thereafter heat and pressure consolidating the assembly into a unitary structure and removing the stencil and that part of the layer of polymeric material which is in direct contact with the non-adherable material while leaving that part of the layer of polymeric material which has become bonded to the overlay sheet intact as a part of the decorative laminate.

2. A process for producing a laminate having discrete proturberant areas of its surface which possess different colors and different optical reflectivities comprising arranging an assembly in stacked relationship of thermosetting resin impregnated core sheets, a noble thermosetting resin impregnated decorative sheet superimposing on said assembly in contact with the uppermost sheet, a configurative, decorative, stencil of a non-adherable material, superimposing on said assembly, in contact with said non-adherable material, a noble thermosetting resin impregnated foil of a color different from the color of the resin in the decorative sheet, thereafter heat and pressure consolidating the assembly into a unitary structure and removing the stencil and that part of the foil which is in direct contact with the non-adherable material while leaving that part of the resin impregnated foil which has become bonded to the overlay sheet intact as a part of the decorative laminate.

3. A process for producing a laminate having discrete protuberant areas of its surface which possess different colors and different optical reflectivities comprising arranging an assembly in stacked relationship of thermosetting resin impregnated core sheets, a noble thermosetting resin impregnated decorative sheet and a noble thermosetting resin impregnated overlay sheet, superimposing on said assembly in contact with the uppermost sheet, a configurative, decorative, stencil of a non-adherable material, superimposing on said assembly, in contact with said non-adherable material, a noble thermosetting resin impregnated foil of a color different from the color of the resin in the decorative sheet, thereafter heat and pressure consolidating the assembly into a unitary structure and removing the stencil and that part of the foil which is in direct contact with the non-adherable material while leaving that part of the resin impregnated foil which has become bonded to the overlay sheet intact as a part of the decorative laminate.

4. A process for producing a laminate having discrete protuberant areas of its surface which possess different colors and different optical reflectivities comprising arranging an assembly in stacked relationship of thermosetting phenolic resin impregnated core sheets, a thermosetting melamine-formaldehyde resin impregnated decorative sheet, a thermosetting melamine-formaldehyde impregnated overlay sheet, superimposing on said assembly in contact with the overlay sheet, a configurative, decorative, stencil of a non-adherable material, superimposing on said assembly in contact with said non-adherable material, a thermosetting melamine-formaldethyde resin impregnated foil of a color different from the color of the resin in the decorative sheet, thereafter heat and pressure consolidating the assembly into a unitary structure and removing the stencil and that part of the foil which is in direct contact with the non-adherable material while leaving that part of the resin impregnated foil which has become bonded to the overlay sheet intact as a part of the decorative laminate.

5. A process for producing a laminate having discrete protuberant areas of its surface which possess different colors and different optical reflectivities comprising arranging an assembly in stacked relationship of thermosetting phenolic resin impregnated core sheets, a thermosetting unsaturated polyester resin impregnated decorative sheet, a thermosetting unsaturated polyester resin impregnated overlay sheet, superimposing on said assembly in contact with the overlay sheet, a configurative, decorative, stencil of a non-adherable material, superimposing on said assembly in contact with said non-adherable material, a thermosetting unsaturated polyester resin impregnated foil of a color different from the color of the resin in the decorative sheet, thereafter heat and pressure consolidating the assembly into a unitary structure and removing the stencil and that part of the foil which is in direct contact with the non-adherable material while leaving that part of the resin impregnated foil which has become bonded to the overlay sheet intact as a part of the decorative laminate.

6. A process for producing a laminate having discrete protuberant areas of its surface which possess different colors and different optical reflectivities comprising arranging an assembly in stacked relationship of thermosetting phenolic resin impregnated core sheets, a thermosetting epoxy resin impregnated decorative sheet, a thermosetting epoxy resin impregnated overlay sheet, superimposing on said assembly in contact with the overlay sheet, a configurative, decorative, stencil of a non-adherable material, superimposing on said assembly in contact with said non-adherable material, a thermosetting epoxy resin impregnated foil of a color different from the color of the resin in the decorative sheet, thereafter heat and pressure consolidating the assembly into a unitary structure and removing the stencil and that part of the foil which is in direct contact with the non-adherable material while leaving that part of the resin impregnated foil which has become bonded to the overlay sheet intact as a part of the decorative laminate.

References Cited

UNITED STATES PATENTS

| 2,721,817 | 10/1955 | Hastings et al. | 161—413 XR |
| 3,190,786 | 6/1965 | Magill et al. | 161—413 XR |
| 3,259,515 | 7/1966 | Pecker | 117—45 XR |
| 2,316,149 | 4/1943 | Bates | 156—277 X |
| 2,694,028 | 11/1954 | Rapp | 161—165 |
| 3,067,077 | 12/1962 | Latella | 156—277 X |
| 3,215,579 | 11/1965 | Hagen | 156—323 X |
| 3,242,027 | 3/1966 | Dowda | 156—277 |

FOREIGN PATENTS

| 348,230 | 5/1931 | Great Britain. |
| 373,737 | 6/1932 | Great Britain. |
| 574,128 | 7/1924 | France. |
| 749,355 | 5/1956 | Great Britain. |

ROBERT F. BURNETT, *Primary Examiner.*

W. A. POWELL, *Assistant Examiner.*

U.S. Cl. X.R.

156—289, 323, 327, 330, 335; 161—3, 5, 6, 184, 232, 233, 264, 413